US011499693B2

(12) United States Patent
Rollinson et al.

(10) Patent No.: US 11,499,693 B2
(45) Date of Patent: Nov. 15, 2022

(54) STAINLESS STEEL LED POWER SWITCH

(71) Applicant: Bocatech, Inc., Deerfield Beach, FL (US)

(72) Inventors: Keith Rollinson, Margate, FL (US); John Paul Santana, Boca Raton, FL (US)

( * ) Notice: Subject to any disclaimer, the term of this patent is extended or adjusted under 35 U.S.C. 154(b) by 0 days.

(21) Appl. No.: 17/314,433

(22) Filed: May 7, 2021

(65) Prior Publication Data
US 2021/0262633 A1 Aug. 26, 2021

Related U.S. Application Data

(60) Continuation of application No. 17/026,677, filed on Sep. 21, 2020, now Pat. No. 11,274,803, which is a (Continued)

(51) Int. Cl.
*H05B 45/30* (2020.01)
*F21S 41/64* (2018.01)
(Continued)

(52) U.S. Cl.
CPC .......... *F21S 41/645* (2018.01); *F21V 23/006* (2013.01); *F21V 23/04* (2013.01); *F21V 31/005* (2013.01);
(Continued)

(58) Field of Classification Search
CPC ...... F21S 41/645; F21V 23/006; F21V 23/04; F21V 31/005; F21W 2107/20; F21Y 2115/10; H05B 45/30; H05B 45/395
See application file for complete search history.

(56) References Cited

U.S. PATENT DOCUMENTS

| 6,220,719 B1* | 4/2001 | Vetorino | F21L 13/06 |
| | | | 362/205 |
| 2009/0284161 A1* | 11/2009 | Kumar | H05B 45/44 |
| | | | 315/209 R |

(Continued)

OTHER PUBLICATIONS

Carling Technologies, Thermal Circuit Breaker C1005B-Series, Oct. 9, 2012 capture from the Wayback Machine https://web.archive.org/web/20121009075333/http://www.carlingtech.com/thermal-cb-c1005b-series (Year: 2012).*

*Primary Examiner* — Kurtis R Bahr
(74) *Attorney, Agent, or Firm* — Christopher & Weisberg, P.A.

(57) ABSTRACT

An encapsulated LED switch that incorporates a MOSFET power drivers, high current transistors, or other suitable power drivers in a PCB that attaches to the LED switch such that a low power LED switch controls the output of a high-power driver. The selected power driver PCB can be adapted to different load requirements by making simple changes. The PCB's can be interchanged to provide for a predetermined output power required for a particular application. In addition, the wire gauge size of the wires attached to the MOSFET power driver PCB can also be varied to match intended load requirements. For applications in which the LED switch is used in hostile environments, such as marine applications, the LED switch and its associated power driver PCB are encapsulated to protect the circuitry from environmental factors such as high humidity, salt water, etc.

19 Claims, 8 Drawing Sheets

Related U.S. Application Data division of application No. 15/013,999, filed on Feb. 2, 2016, now Pat. No. 10,785,836.

(60) Provisional application No. 62/111,083, filed on Feb. 2, 2015.

(51) Int. Cl.
| | |
|---|---|
| *F21V 23/04* | (2006.01) |
| *F21V 31/00* | (2006.01) |
| *F21V 23/00* | (2015.01) |
| *F21W 107/20* | (2018.01) |
| *F21Y 115/10* | (2016.01) |
| *H05B 45/395* | (2020.01) |

(52) U.S. Cl.
CPC ......... *H05B 45/30* (2020.01); *F21W 2107/20* (2018.01); *F21Y 2115/10* (2016.08); *H05B 45/395* (2020.01)

(56) References Cited

U.S. PATENT DOCUMENTS

2012/0021373 A1\* 1/2012 Moreno ............... A61C 17/088
433/31
2012/0262091 A1\* 10/2012 Maglica ................. F21L 4/005
315/307
2017/0033583 A1\* 2/2017 Inskeep ................ H05B 47/165

\* cited by examiner

STAINLESS STEEL LED POWER SWITCH

CLAIM OF PRIORITY

This application is a continuation of U.S. patent application Ser. No. 17/026,677 filed Sep. 21, 2020, which claims the benefit of U.S. patent application Ser. No. 15/013,999 filed Feb. 2, 2016, which claims the benefit of the provisional patent application entitled "LED/MOSFET Two-Stage Power Switch," filed Feb. 2, 2015, bearing U.S. Ser. No. 62/111,083; the disclosures of the foregoing are incorporated in their entireties by reference herein.

BACKGROUND OF THE INVENTION

Field of the Invention

The present invention relates to LED switches in general, and LED switches for use in marine environments in particular. Further, it relates to compact LED switches that use integral power drivers to control high-current applications such as pumps and horns with a small switch assembly. The integral power drivers can be MOSFET power drivers, high current transistors or other suitable power drivers.

Description of the Related Art

Presently 19 mm LED Stainless Steel Switches are used for a variety of application. In particular, they are frequently used in marine applications due to the advantages of small size and durability they provide. Stainless steel LED switches in particular provide advantages in the hostile environment found in marine applications. Although very popular, prior art LED switches are limited in the number of applications they can control due to the limited amount of current they can output. Typically, an LED switch by itself is limited to low DC amp loads. In particular, prior art LED switches provide up to 5 DC Amp loads (resistive) or 3-amp loads (Inductive), and as a result, they are unsuitable for high current applications such as pumps and horns.

While stainless steel is an excellent choice of material for fabricating the encapsulation sleeve due to its strength, durability and resistance to environmental factors, those skilled in the art will recognize that any other suitable material can be used so long as it performs well in the environment that the sleeve is used in.

In marine environments, boats and marine vehicles of all sizes place a premium on space due to the space limitations on any size boat or ship. One an advantage provided by LED switches is that their small size is useful on boats of all sizes due to the size and storage constraints that all marine vehicles have. A problem associated with prior art LED switches is that they are not capable of carrying heavy currents, and as a result, there are a variety of applications and devices that they cannot be used for because they cannot deliver the current necessary to operate those devices. It would be desirable to have a small compact device such as an LED switch that was capable of supplying high current modes.

While these various prior art LED switches accomplish their intended purposes, they are not suitable for controlling high-current applications. As a result, the prior art has failed to provide a compact switching assembly that takes minimum space and is resistant to hostile environments, while simultaneously producing high power outputs.

SUMMARY OF THE INVENTION

The present invention provides an encapsulated LED switch that incorporates a new MOSFET power driver, or high power transistor PCB (printed circuit board) that attaches to the LED switch such that a low power LED switch controls the output of a high power driver. The PCB is attached to the LED switch and the resulting switch assembly is inserted into a mold and sealed via epoxy or a suitable alternatives to provide a thermally conductive, waterproof and ignition proof switch. The selected MOSFET or high power transistor driver PCB can be adapted to different load requirements by making simple changes. The PCB's can be interchanged to provide for a predetermined output power required for a particular application. In addition, the wire gauge size of the wires attached to the power driver PCB can also be varied to match intended load requirements. For applications in which the LED/MOSFET switch is used in hostile environments, such as marine applications, the LED switch and its associated MOSFET power driver PCB are encapsulated to protect the circuitry from environmental factors such as high humidity, salt water, etc.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

DETAILED DESCRIPTION OF THE PREFERRED EMBODIMENT

The invention provides a sealed high-power switch that is encapsulated to protect the switch from environmental factors. For ease of discussion, the invention will be discussed in terms of use with marine equipment. However, those skilled in the art will recognize that the invention provides the same benefits to a wide range of other applications in many fields, such as aviation, automotive, computers, etc.

Figure 1:
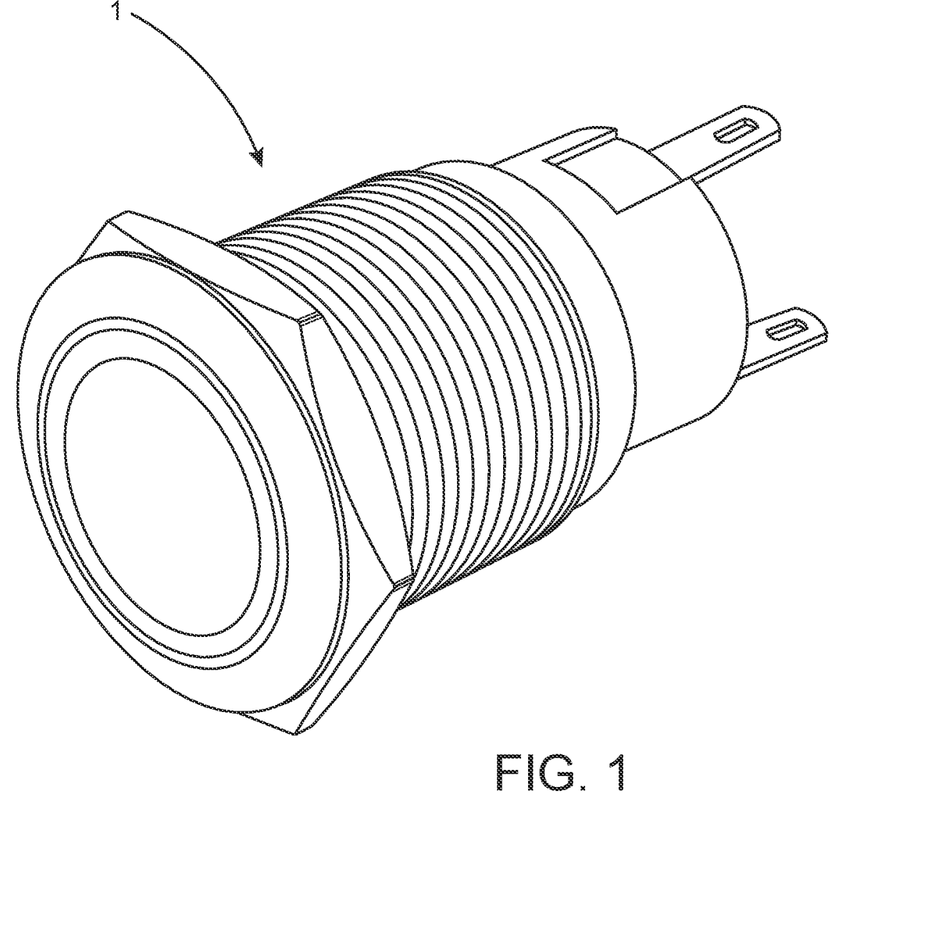
FIG. 1 illustrates a typical LED 5A VDC Amp switch.

In FIG. 1, a prior art LED switch 1 is shown. This particular switch is fabricated with a stainless-steel sleeve to protect the switch from corrosive elements that are typically found in marine environments. Once the LED switch 1 is fabricated, the stainless-steel sleeve is sealed with an environmentally insensitive material to prevent exposure of the electrical and mechanical components to the external environment. In the preferred environment, the stainless-steel sleeve is filled with epoxy, but any other material can be used that is suitable for the task. Likewise, the sleeve can be fabricated with material other than stainless steel so long as the material is suitable for its intended task.

Figure 2:
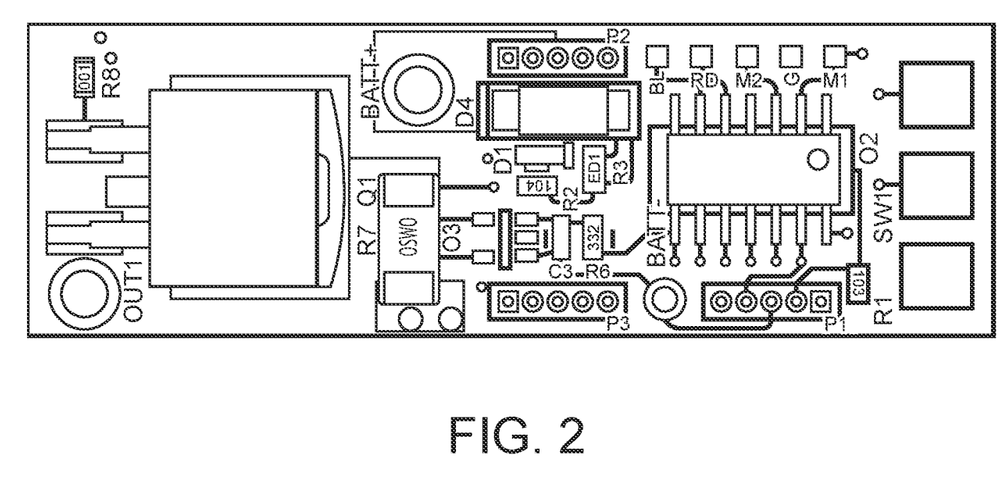
FIG. 2 illustrates a MOSFET power driver PCB.

FIG. 2 illustrates a power driver PCB 2. In the preferred embodiment, the power driver PCB 2 is sized to have approximately the same width as the LED switch 1 such that they can be packaged together more easily.

Figure 3:
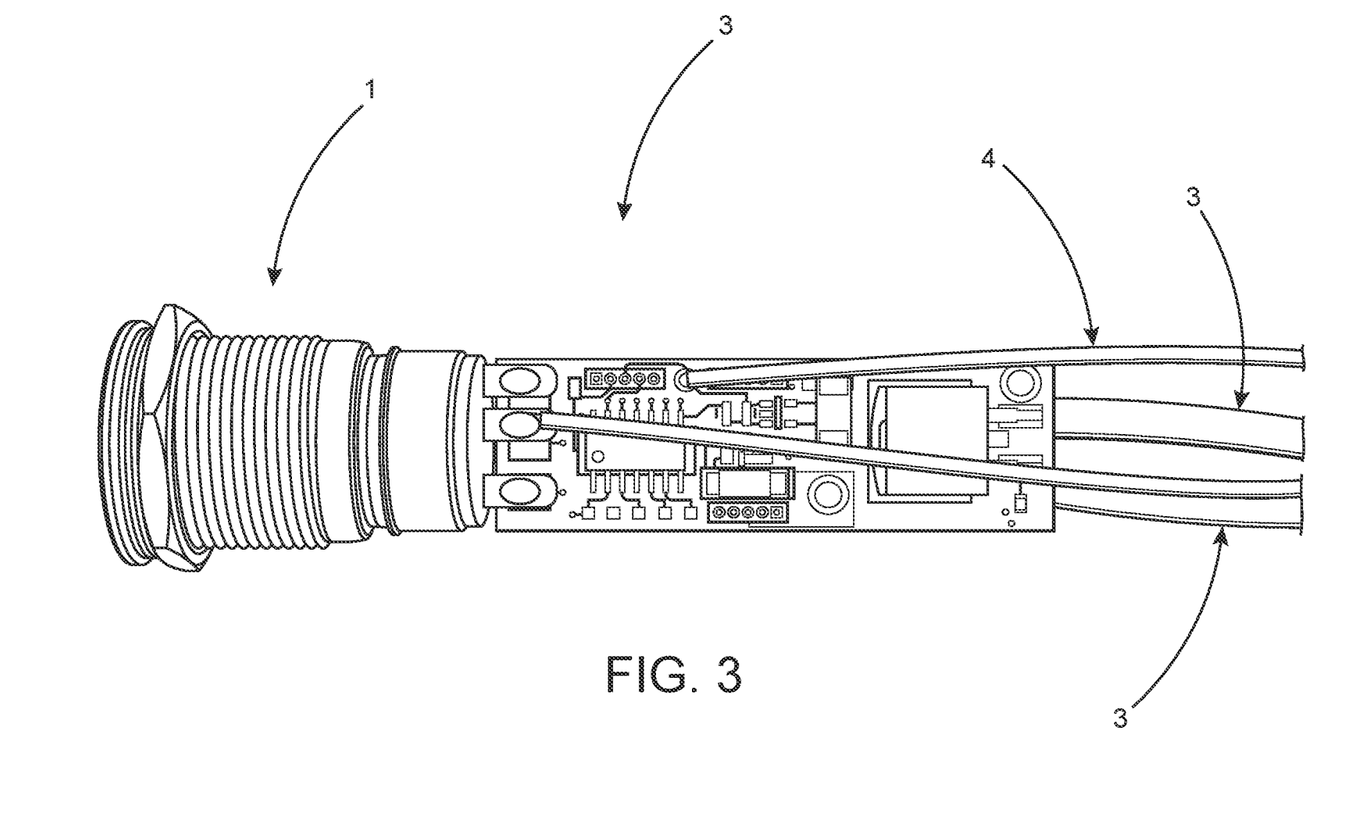
FIG. 3 illustrates a preferred embodiment of the power switch assembly comprising an LED switch and a MOSFET power driver PCB.

FIG. 3 illustrates a preferred embodiment of the power switch assembly 3 comprising an LED switch 1 and a MOSFET or high-power transistor power driver PCB 2. As shown, the led switch 1 and the MOSFET or high-power transistor power driver PCB 2 are sized with roughly the same width for packaging purposes. In addition, power lines 3-4 are shown attached to the output of the MOSFET power driver PCB 2. Power lines 3-4 provide power to current intensive devices on marine or other equipment such as pumps, horns, etc. Ground line 4 is also illustrated.

Figure 4:
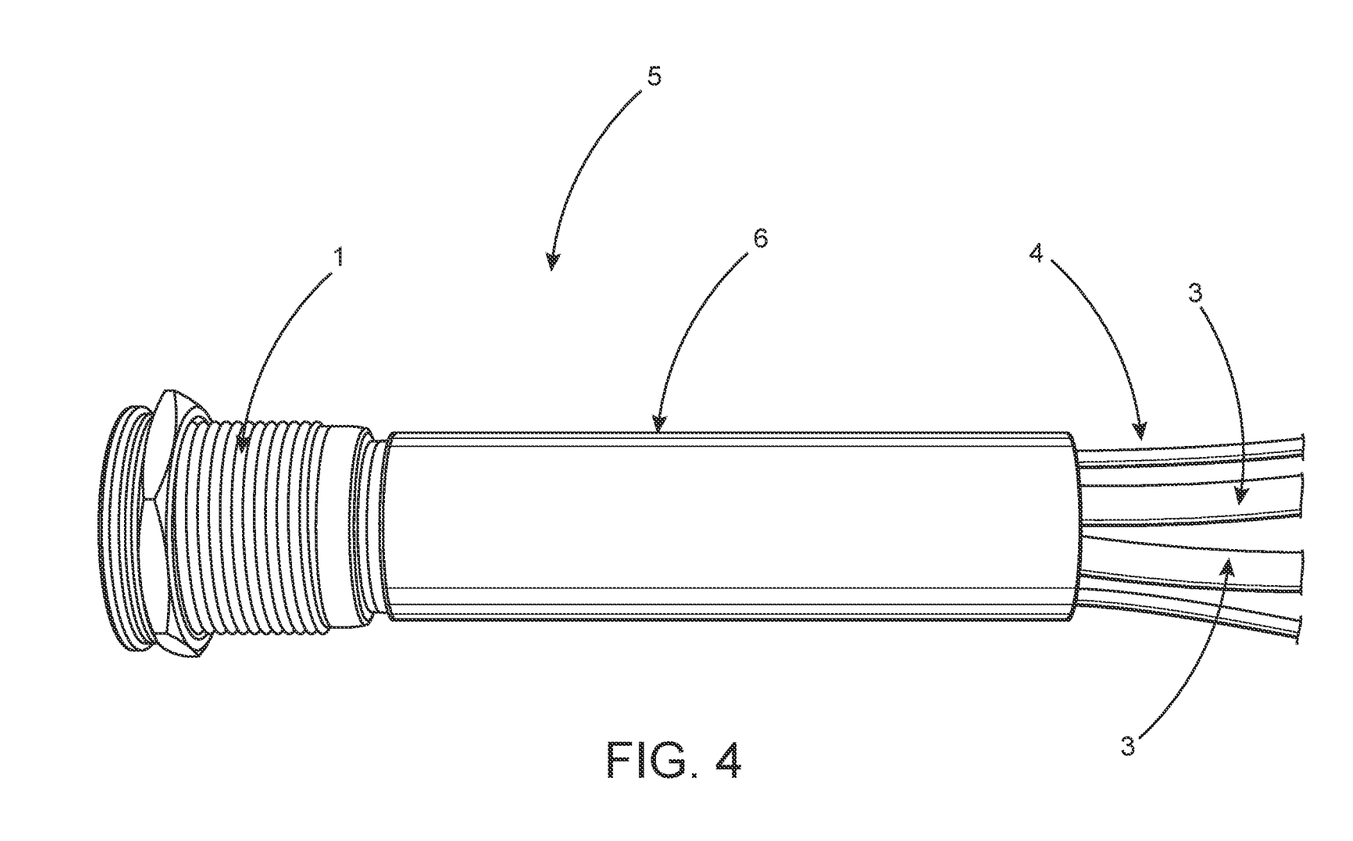
FIG. 4 illustrates a preferred embodiment of the power switch assembly comprising an LED switch and a MOSFET power driver PCB with a sealed encapsulation sleeve.

FIG. 4 illustrates a preferred embodiment of an encapsulated power switch assembly 5 comprising an LED switch 1 and a MOSFET or high-power transistor power driver PCB 2 that is enclosed in a sealed encapsulation sleeve 6. In the preferred embodiment, the encapsulated power switch assembly 5 is sealed with epoxy to isolate the internal circuitry from the environment.

The following FIGS. 5-8 are examples of circuits that can take advantage of the invention. However, those skilled in the art will recognize that any number of circuits can be designed to perform a wide variety of functions.

Figure 5:
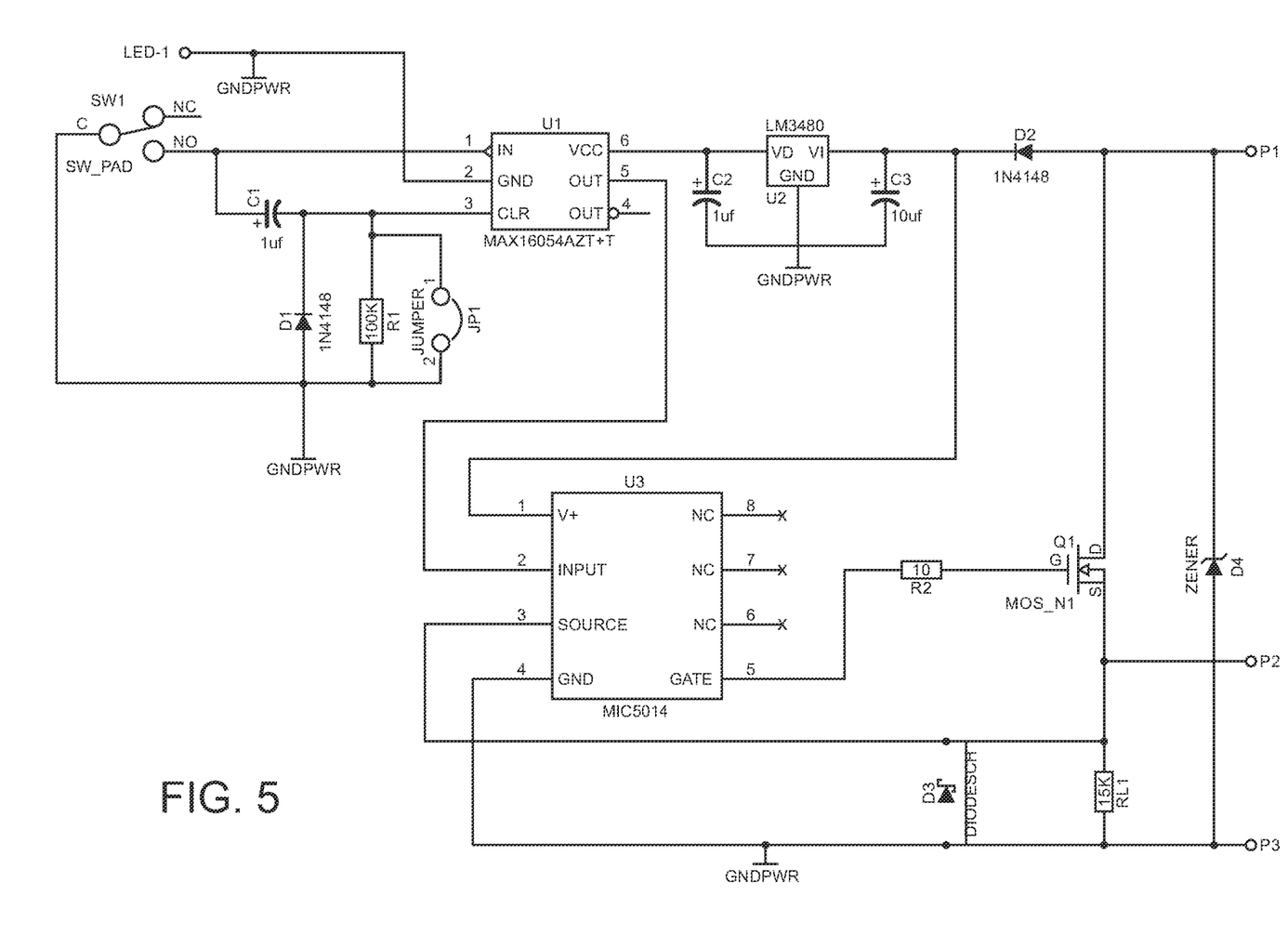
FIG. 5 illustrates a preferred embodiment of the power switch assembly comprising an LED switch capable of providing high current loads.

FIG. 5 illustrates a preferred embodiment of the power switch assembly comprising an LED switch capable of providing high current loads. An advantage of the invention is that the functional characteristics of the switch can be easily altered based upon the PCB selected for a particular function. By way of example, the circuit shown in this figure is capable of providing current loads up to 20 ADC to a device. This embodiment uses a BT15LEDSW-M circuit that provides a Momentary 15 ADC. Another alternative embodiment uses a commercially available BT15LEDSW circuit, which is an On/Off 15 ADC. A further alternative embodiment is the BT15LEDSW-MF is also a Momentary 15 ADC, but differs in that it has a resettable thermal breaker. Yet another alternative preferred embodiment uses a BT15LEDSW-F, which is an On/Off 15 ADC with a resettable thermal breaker. The PCBs provided as an example are commercially available from Bocatech, Inc. For all of the resettable thermal switches, a single thermal breaker, such as a commercially available UL Bussman thermal breaker, among others, is installed in-line with the power input to the switch. Of course, any number of other suitable switches can be used to suit a particular purpose. As a result, the foregoing embodiments are exemplary only and do not limit the types of PCBs that can be used as a component of the switch. In practice, the invention envisions switches having a variety of ratings including but not limited to 5, 10, 15 and 20 ADC.

Those skilled in the art will recognize that any color led can be selected based on design preferences.

Figure 6:
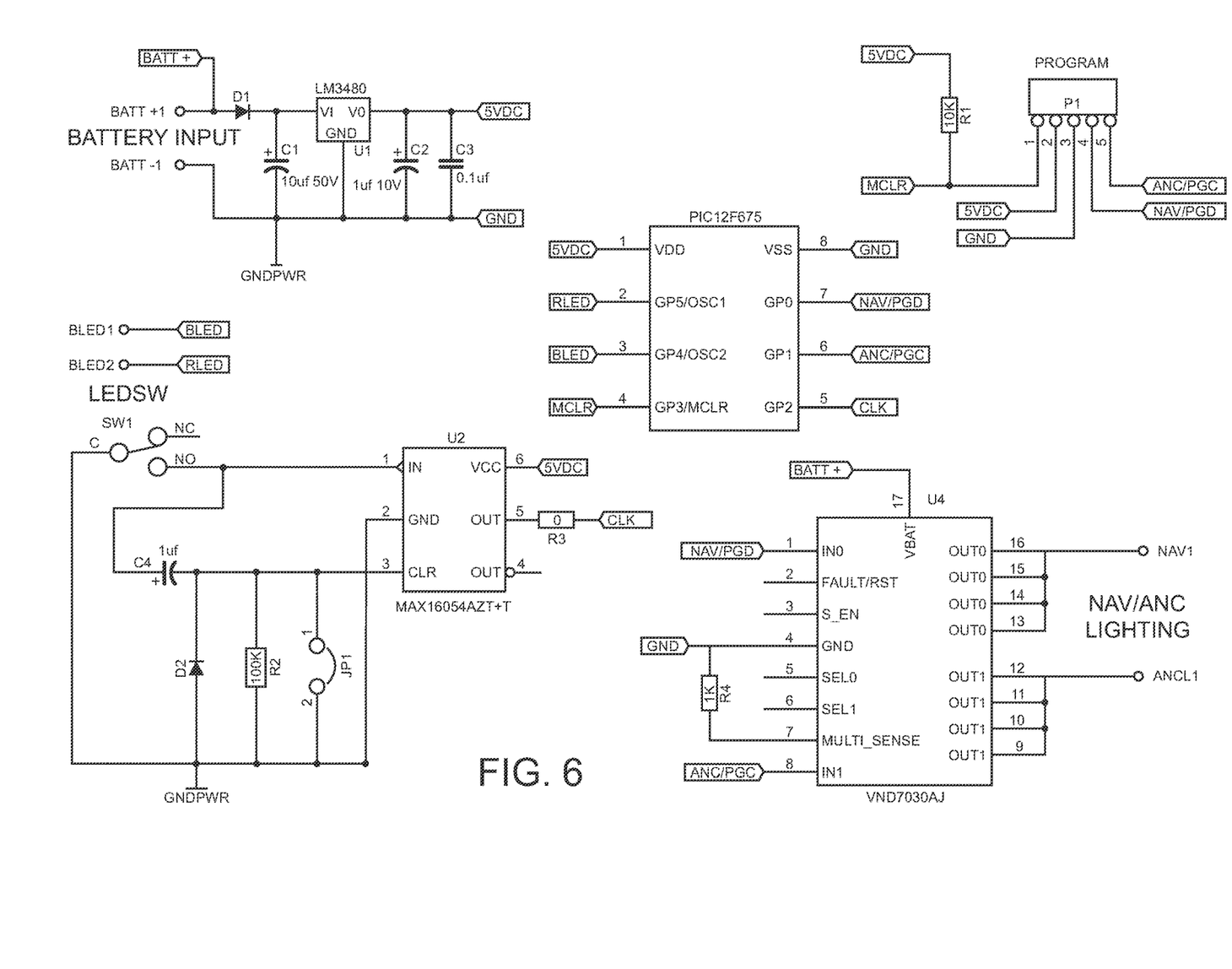
FIG. 6 illustrates an alternative preferred embodiment of the power switch assembly that provides a programmable two-circuit navigation and anchor light driver circuit.

FIG. 6 illustrates a preferred embodiment of the power switch assembly that provides a programmable two-circuit navigation and anchor light driver circuit. The PCB circuit used in this embodiment is a BTNAVLEDSW circuit that is commercially available from Bocatech, Inc. The circuit uses a bi-color LED switch that functions as follows:

1. One push of the switch button activates the blue switch LED and activates both circuit outputs to illuminate the navigation and anchor lights on a vessel.

2. The second push of the switch button turns off the blue switch LED and turns on the red switch LED and activates only the circuit controlling the anchor lights.

An alternative embodiment uses a microcontroller on the PCB to provide a timer function that automatically turns off the navigation lights in the event the boat owner forgets to do so.

Figure 7:
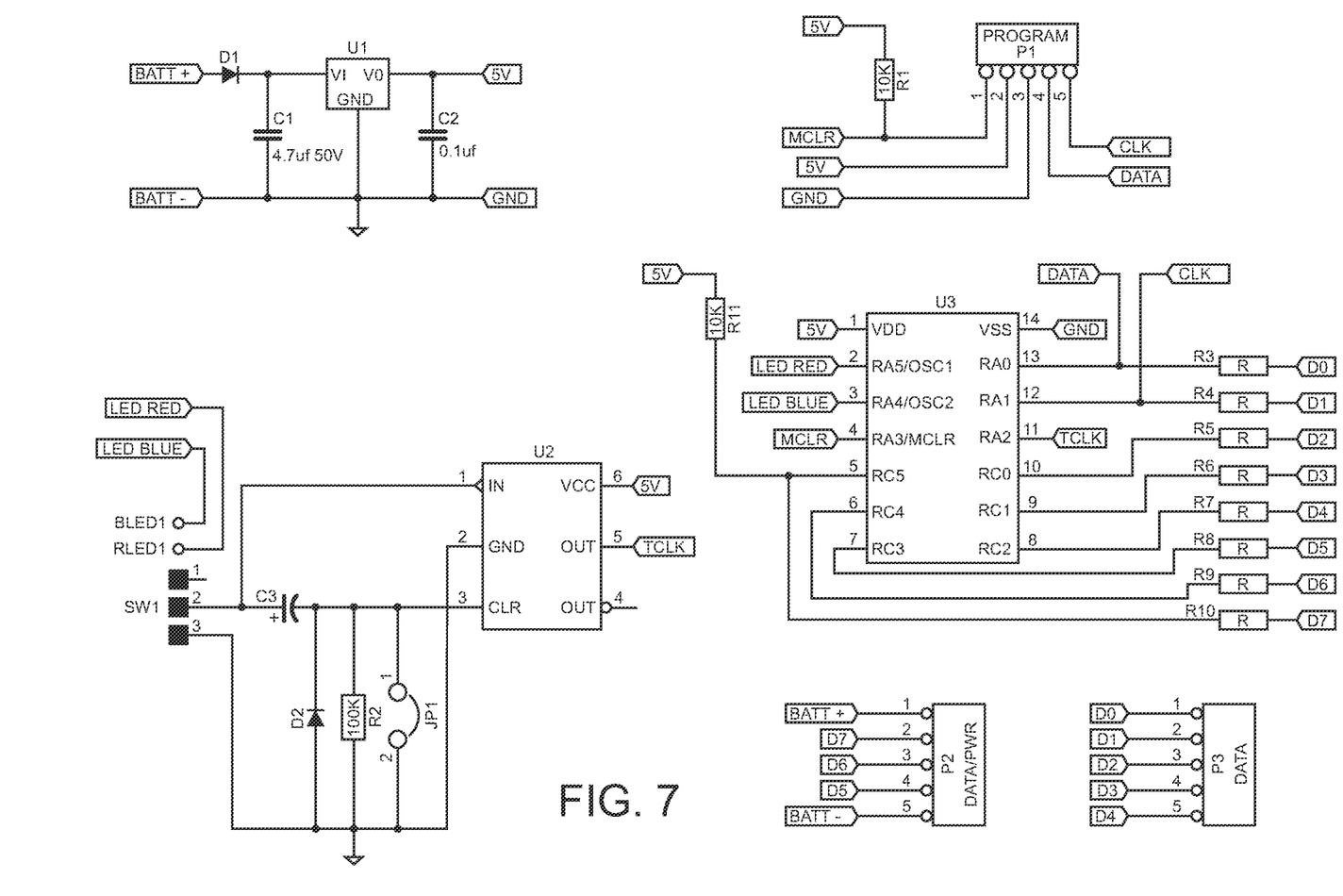
FIGS. 7-8 illustrate alternative preferred embodiments of the power switch assembly that provide programmable circuits capable of driving multiple solenoid driver circuits.
Figure 8:
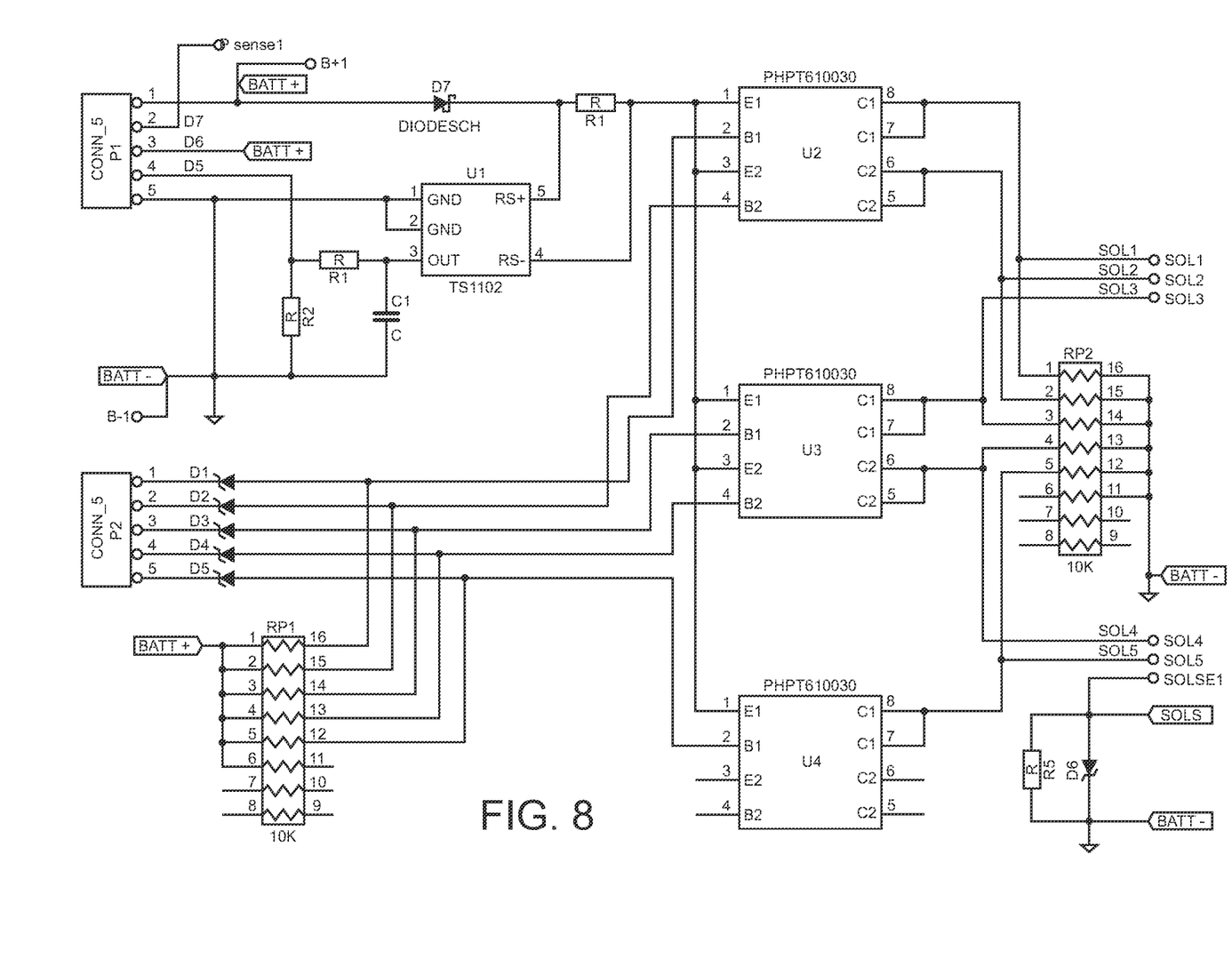

FIGS. 7-8 illustrate other alternative preferred embodiments of the power switch assembly that provide programmable circuits capable of driving multiple solenoid driver circuits. In addition, the PCB can be fabricated from two separate PCBs that are plugged together and assembled as a single switch assembly. This allows PCBs having various functions be joined together for a particular application. As a result, the resulting circuit can provide multiple functions such as solenoid drivers, water pressure sensors, current monitoring, etc. In addition, safety features such as alarms can be incorporated into the PCB that alerts the boater by flashing the red LED on a bi-color switch. Likewise, those skills in the art recognize that audible alarm can also be built into the switch.

As can be seen, the invention provides a low power switch that controls a high power MOSFET driver to provide power to a variety of devices, while protecting the circuitry from harsh environments, such as in marine applications. Further, the switch disclosed herein can be designed to use one of many PCBs that are capable of forming any number of functions.

Because the switches disclosed herein may be designed with microprocessors for micro controllers, they would in effect become smart switches that include one or more of the following capabilities:

1. Programming capabilities (e.g., On/Off, Momentary, multimode etc.).
2. Communications capability (e.g. NEMA2000, CAN, RS232, USB, etc.).
3. Current monitoring, including shutdown.
4. Overvoltage and undervoltage monitoring.
5. Multicolor LED switch controls.
6. Visual and audible alarm functions.
7. Sensor applications, such as water pressure, air pressure, fuel pressure, oil pressure, vacuum pressure, etc.
8. Timer and counter functions with indicators.
9. Data acquisition.
10. Adaptable to switches of different types and sizes.
11. Ignition proof.

As can be seen from the foregoing discussion, the invention provides a number of advantages. It is inexpensive to manufacture, it is compact and lightweight, it provides effective protection of electronic circuitry from the outside environment, and can be use in a wide variety of environments and technical and commercial areas.

While the invention has been described with respect to a preferred embodiment thereof, it will be understood by those skilled in the art that various changes in detail may be made therein without departing from the spirit, scope, and teaching of the invention. For example, the material used to construct the switch may be anything suitable for its purpose, the size and shape of the encapsulated power switch assembly can vary, the type of circuitry can vary, etc. Accordingly, the invention herein disclosed is to be limited only as specified in the following claims.

Now that the invention has been described,

What is claimed is:

1. A high-power switch assembly comprising:
an LED switch having an on and an off position, a PCB driver electrically connected to said LED switch and having at least one output line, said PCB driver comprising a switch debouncer electrically connected to said LED switch, said PCB driver comprising a Metal-Oxide-Semiconductor Field-Effect Transistor, MOSFET, driver electrically connected to said switch debouncer, and said PCB driver outputting an amperage sufficient to power a marine pump on said output line when said LED switch is in the on position.

2. The high-power switch assembly of claim 1, wherein said PCB driver further comprises a MOSFET, said MOSFET comprising a gate electrically connected to said MOSFET driver, and a source operatively connected to said output of said PCB driver.

3. The high-power switch assembly of claim 1, wherein said LED switch is a momentary switch.

4. The high-power switch assembly of claim 3 wherein said LED switch comprises a reset table thermal breaker.

5. The high-power switch assembly of claim 1, wherein said LED switch is an on/off switch.

6. The high-power switch assembly of claim 5, wherein said LED switch comprises a resettable thermal breaker.

7. The high-power switch assembly of claim 1, further comprising an encapsulation sleeve, and said LED switch and PCB driver are disposed within said encapsulation sleeve.

8. The high-power switch assembly of claim 7, wherein said encapsulation sleeve comprises epoxy.

9. The high-power switch assembly of claim 7, wherein said encapsulation sleeve is sealed to isolate said PCB driver and LED switch from the environment.

10. The high-power switch assembly of claim 1, wherein said PCB driver comprises a MOSFET.

11. A high-power switch assembly comprising:

an encapsulation sleeve, a PCB driver with at least one output line, said PCB driver being disposed within said encapsulation sleeve, an LED switch operatively connected to said PCB driver and having an on and an off position, said PCB driver comprising a switch debouncer electrically connected to said LED switch, said PCB driver comprising a Metal-Oxide-Semiconductor Field-Effect Transistor, MOSFET, driver electrically connected to said switch debouncer, and said PCB driver outputting an amperage sufficient to power a marine pump on said output line.

12. The high-power switch assembly of claim 11, wherein said PCB driver further comprises a MOSFET, said MOSFET comprising a gate electrically connected to said MOSFET driver, and a source operatively connected to said output line.

13. The high-power switch assembly of claim 11, wherein said LED switch is a momentary switch.

14. The high-power switch assembly of claim 13 wherein said LED switch comprises a resettable thermal breaker.

15. The high-power switch assembly of claim 11, wherein said LED switch is an on/off switch.

16. The high-power switch assembly of claim 15, wherein said LED switch comprises a reset table thermal breaker.

17. A high-power switch assembly comprising:

an encapsulation sleeve comprising an epoxy material of construction, a PCB driver disposed within said encapsulation and comprising at least one output line, an LED switch having an on and an off position, said LED switch being electrically connected to said PCB driver, said PCB driver comprising a switch debouncer electrically connected to said LED switch, said PCB driver comprising a Metal-Oxide-Semiconductor Field-Effect Transistor, MOSFET, driver electrically connected to said switch debouncer, said PCB driver comprising a MOSFET, said MOSFET comprising a gate electrically connected to said MOSFET driver, and a source operatively connected to said output line of said PCB driver, and said PCB driver outputting an amperage sufficient to power a marine pump on said output line when said LED switch is in the on position.

18. The high-power switch assembly of claim 17, wherein said LED switch comprises a resettable thermal breaker.

19. The high-power switch assembly of claim 17, wherein said encapsulation sleeve is sealed from the environment.

* * * * *